US009697339B2

(12) United States Patent
Witter et al.

(10) Patent No.: US 9,697,339 B2
(45) Date of Patent: Jul. 4, 2017

(54) ONLINE MUSIC NETWORKING SYSTEM

(71) Applicants: Tremaine Witter, Coram, NY (US);
Hans Dolce, Bay Shore, NY (US)

(72) Inventors: Tremaine Witter, Coram, NY (US);
Hans Dolce, Bay Shore, NY (US)

( * ) Notice: Subject to any disclaimer, the term of this patent is extended or adjusted under 35 U.S.C. 154(b) by 590 days.

(21) Appl. No.: 14/177,926

(22) Filed: Feb. 11, 2014

(65) Prior Publication Data

US 2015/0229672 A1    Aug. 13, 2015

(51) Int. Cl.
| | |
|---|---|
| G06F 7/04 | (2006.01) |
| G06F 17/30 | (2006.01) |
| H04N 7/16 | (2011.01) |
| G06F 21/10 | (2013.01) |
| H04L 29/06 | (2006.01) |
| H04L 12/18 | (2006.01) |
| H04L 12/58 | (2006.01) |

(52) U.S. Cl.
CPC .......... *G06F 21/10* (2013.01); *H04L 12/1822* (2013.01); *H04L 63/10* (2013.01); *H04L 65/60* (2013.01); *H04L 12/184* (2013.01); *H04L 12/1813* (2013.01); *H04L 12/1845* (2013.01); *H04L 51/32* (2013.01); *H04L 63/20* (2013.01); *H04L 63/30* (2013.01)

(58) Field of Classification Search
CPC ......... H04L 63/10; H04L 63/20; H04L 63/30; H04L 12/184; H04L 12/1845; H04L 65/60
USPC ............................................. 726/26; 709/231
See application file for complete search history.

(56) References Cited

U.S. PATENT DOCUMENTS

| | | | | |
|---|---|---|---|---|
| 7,221,387 | B2* | 5/2007 | Fernandez | H04L 12/1813 348/14.08 |
| 7,263,610 | B2* | 8/2007 | Parker | H04N 7/17318 348/E7.071 |
| 7,509,124 | B2* | 3/2009 | O'Neil | H04N 7/17318 455/403 |
| 8,484,463 | B1* | 7/2013 | Krishnamurthy | H04L 63/104 340/531 |
| 8,763,157 | B2* | 6/2014 | Navar | G06F 21/10 726/27 |
| 8,996,421 | B2* | 3/2015 | Kahn | G06F 21/10 705/59 |
| 2005/0021802 | A1* | 1/2005 | Chen | H04L 12/1836 709/231 |
| 2005/0229228 | A1* | 10/2005 | Relan | H04H 60/33 725/116 |

(Continued)

*Primary Examiner* — Jayesh Jhaveri
(74) *Attorney, Agent, or Firm* — Dale J. Ream

(57) ABSTRACT

An online music networking system that utilizes the internet for coordinating the sharing and listening of music includes a computer having a processor connected to ta network such as the internet. The system includes a player database that includes player records associated with a plurality of "players" who wish to share music with others through the network. A music database includes music records associated with respective players in the player database. A listener database is includes listener records associated with a plurality of "listeners" who wish to listen to music that is associated with respective players. The player may select to listen to a selected one of his music files as a live stream through the internet. A listener may also listen to the same live stream by becoming a "follower" of the player or selected music file, but may not exercise any control over it.

15 Claims, 4 Drawing Sheets

(56) References Cited

U.S. PATENT DOCUMENTS

| | | | |
|---|---|---|---|
| 2006/0031548 A1* | 2/2006 | Funchess | H04L 29/06027 709/231 |
| 2008/0207137 A1* | 8/2008 | Maharajh | G06F 17/30035 455/74 |
| 2009/0125934 A1* | 5/2009 | Jones | H04N 7/163 725/28 |
| 2011/0066745 A1* | 3/2011 | Olsson | H04N 7/173 709/231 |
| 2014/0156373 A1* | 6/2014 | Roberts | H04L 67/10 705/14.35 |
| 2015/0019750 A1* | 1/2015 | Wainner | H04N 5/765 709/231 |
| 2015/0052621 A1* | 2/2015 | Yi | H04L 63/102 726/31 |
| 2015/0281756 A1* | 10/2015 | Soon-Shiong | H04N 21/2668 725/14 |
| 2016/0105698 A1* | 4/2016 | Tang | G11B 27/10 725/14 |

* cited by examiner

ONLINE MUSIC NETWORKING SYSTEM

BACKGROUND OF THE INVENTION

This invention relates generally to online social networking systems and, more particularly, to an online music networking system that enables users to stay connected with peers in an online social setting and to share music of different genres in real time with their peers. The system also enables users to make acquaintance with other users who share tastes in music through the method of following or "piggybacking" the music being listened to by another user.

A social network is a web based platform that allows users to interact with others over the internet, such as to share ideas, pictures, posts, activities, events, and interests with people in their network. Some networks may be specific to groups having a common interest, academic discipline, profession, or other theme. Online networks are typically characterized by providing means for users to select other users to follow or with whom to share information on an ongoing basis, e.g. to choose "friends" as in the case of the social network known as Facebook®.

In addition, online networks have in the past included means for users to copy musical recordings belonging to others although this practice has been largely criticized as fostering violations of Copyright laws. Presently, there is no online social network that allows peers to stay connected to one another while at the same time sharing musical recordings in real time with others who desire to listen. Therefore, it would be desirable to have an online music social networking system that enables users to "follow" the musical listening activities of their peers and, in fact, to "piggyback" and listen right along with them in real time. Further, it would be desirable to have an online music social network that may be accessed through the internet, such as through a computer or Smartphone. In addition, it would be desirable to have an online music social network that allows a "listener" to access a live stream of a "player's" selected song through the internet while not allowing the streamed music to be recorded, paused, stopped, or otherwise controlled.

SUMMARY OF THE INVENTION

An online music networking system according to the present invention that utilizes a wide area network for coordinating the sharing and listening of music includes a computer having a processor connected to the wide area network and that provides a user interface to the network. Programming and data structures are stored in a computer readable memory in data communication with the processor. The system includes a player database stored in the memory that includes player records associated with a plurality of "players" who wish to share music with others through the wide area network. A music database is stored in the memory and includes music records associated with respective players in the player database. A listener database is stored in the memory that includes listener records associated with a plurality of "listeners" who wish to listen to music that is associated with respective players. The player may select to listen to a selected one of his music files as a live stream through the internet. A listener may also listen to the same live stream by becoming a "follower" of the player or selected music file, but may not exercise any control over it.

Therefore, a general object of this invention is to provide an online music networking system that enables peers and friends to stay connected while also sharing music therewith.

Another object of this invention is to provide an online music networking system, as aforesaid, that enables music "listeners" to follow the music being listened to by another user and to join a live stream of that music in real time as it is being played.

Still another object of this invention is to provide an online music networking system, as aforesaid, in which a "player" may upload one music file or many music files to a computer server and select a music file to play back as a live stream over the internet (which may be accessed from a smart phone).

Yet another object of this invention is to provide an online music networking system, as aforesaid, in which a listener accessing the system may review what songs other players are listening to live and may select to follow a respective player and be granted access to the respective live stream.

A further object of this invention is to provide an online music networking system, as aforesaid, in which the live stream of a player's selected music file may be accessed by multiple "listeners" simultaneously so long as they have selected to "follow" the player.

A still further object of this invention is to provide an online music networking system, as aforesaid, in which music files, player database records, listener database records, and programming steps are stored in a computer network server situated virtually "in the cloud" and accessible through the internet and through a mobile telephone app that is connected to the internet.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
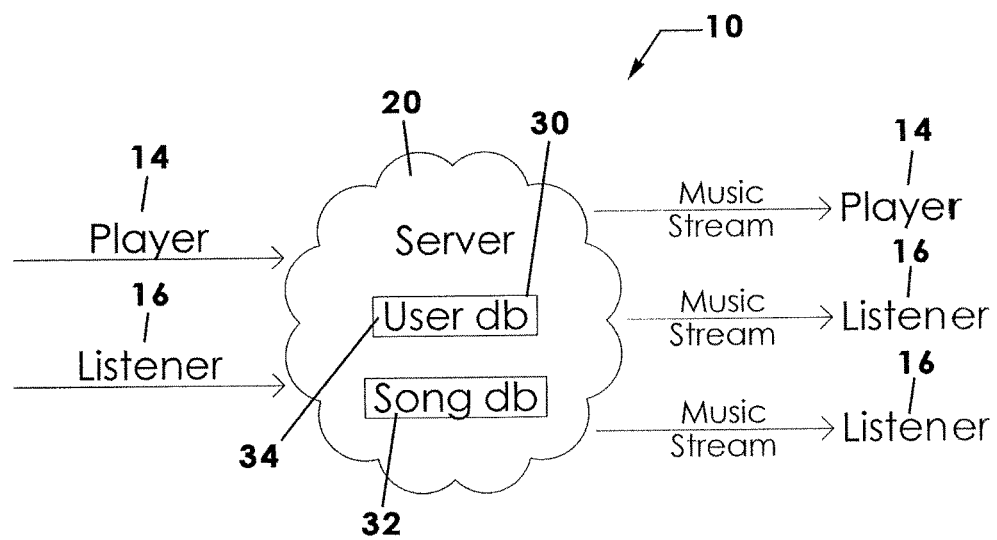
FIG. 1 is a block diagram illustrating a conceptual overview of an online music networking system in "cloud" communication with users known as "players" and "listeners"
Figure 2:
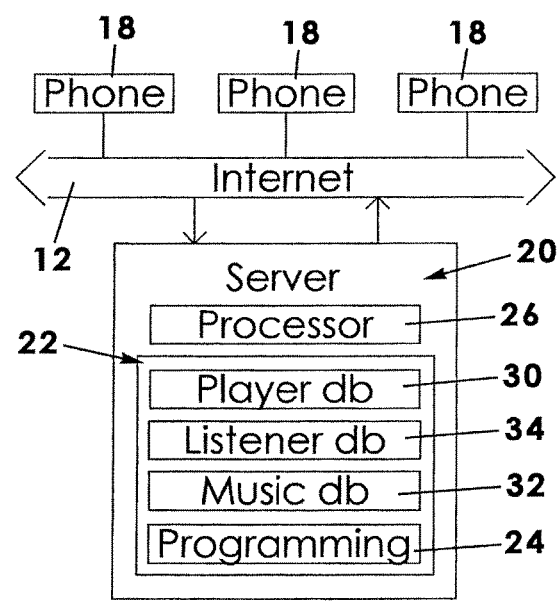
FIG. 2 is a block diagram illustrating connection of the online music networking system to the internet and to mobile telephonic devices.

An online music networking system will now be described with reference to FIGS. 1 to 1 to 5 of the accompanying drawings. The online music networking system 10 includes a computer 20, preferably a network server, operably connected to a wide area network such as the internet 12 and accessible by remote computers in a traditional manner. It is understood that the internet is also readily accessible by cellular telephones 18 such as so-called "Smartphones" or iPhones® (iPhone is a registered trademark of Apple, Inc.). It is understood that the online music networking system 10 according to the present invention may be marketed and accessed as a "mobile app" on Smartphones.

The online music networking system 10 allows users referred to as "players" 14 to store their legally purchased music files "in the cloud" and streamed back to them as desired and also for users known as "listeners" to "piggyback" or listen to the streaming of a selected player's music stream. The live stream of a stored music file is never copied, stored in another medium, or any other usage that would violate the copyrights of the original owner of the artistic work of authorship.

The computer 20 may include a computer readable memory 22 configured to store data structures and programming steps 24 and include a processor 26 configured to process the programming steps in a manner that operates the system 10 (FIG. 1) as will be described in more detail later. The memory 22 may be configured to store one or more databases of organized data that may be gathered, stored, and manipulated by the programming steps 24.

The data structures may include a player database 30 stored in memory 22 that includes a plurality of player records associated with a plurality of users referred to as "players" 14 who have chosen to upload one or more music files, i.e. personal music library, with which to share with other users referred to as "listeners" as will be described later in more detail.

Further, the data structures may include a music database 32 stored in memory 22 that includes a plurality of music records associated with respective player records in the player database 30. For instance, when a player uploads a music file or a plurality of music files (i.e. a music library), each uploaded music file is stored in memory 22 for later use in actuating a live stream back to the respective player who uploaded it or to one or more listeners who are authorized to access the live stream according to the programming steps 24 that will be described later.

Still further, the data structures may include a listener database 34 stored in memory 22 that includes a plurality of listener records associated with a plurality of users referred to as "listeners" 16 who have indicated a desire or request to access and receive a live stream of a music file in real time as it is being streamed and listened to by a respective player 14. Each listener is able to browse the player database to determine which players have uploaded music files they would like to listen to, each listener having an opportunity to "follow" or "piggyback" by listening to the player's stream of a selected song in real time when the player has chosen to listen to the music file through the wide area network.

The computer 20 has security procedures and controls for limiting access via the internet to users that have registered or created an account. Security (also referred to as access control) may be implemented by registering account identifiers and passwords. Registration is preferred so as to monitor any abusive or disallowed behavior, to disallow access to the files of members when appropriate, etc. In one embodiment, however, the computer 20 may allow access to the public—meaning that non-registered users/listeners may be allowed to access the online music networking system 10 and be granted access to any or all of the databases, to live streams of music files being streamed by players having granted such a level of access, and the like.

Preferably, each player record includes a list of listeners who have requested to "follow" the player and who have been given access to a live stream of the player's music library or to a particular music file. Each listener 16 who has selected a player or music file to follow and is on the respective player list is deemed to be "authorized" to access respective live streams in real time when the player requests to listen to a selected music file.

Each music file may also include purchase data. More particularly, purchase data indicative of a music publisher, a website capable of an online sale of a respective song or album, or direct order placement, or the like is associated with each stored music file in the music database for selective access or display according to programming of the present invention.

It is understood that the databases described above may be filled with data by players 14 and listeners 16 who log in and use the system. Specifically, the system 10 utilizes a user-friendly interface that enables a player to upload music, enables a listener to select to follow players associated with selected music files, and enables respective players and listeners to listen to live streams of selected music files.

Figure 3:
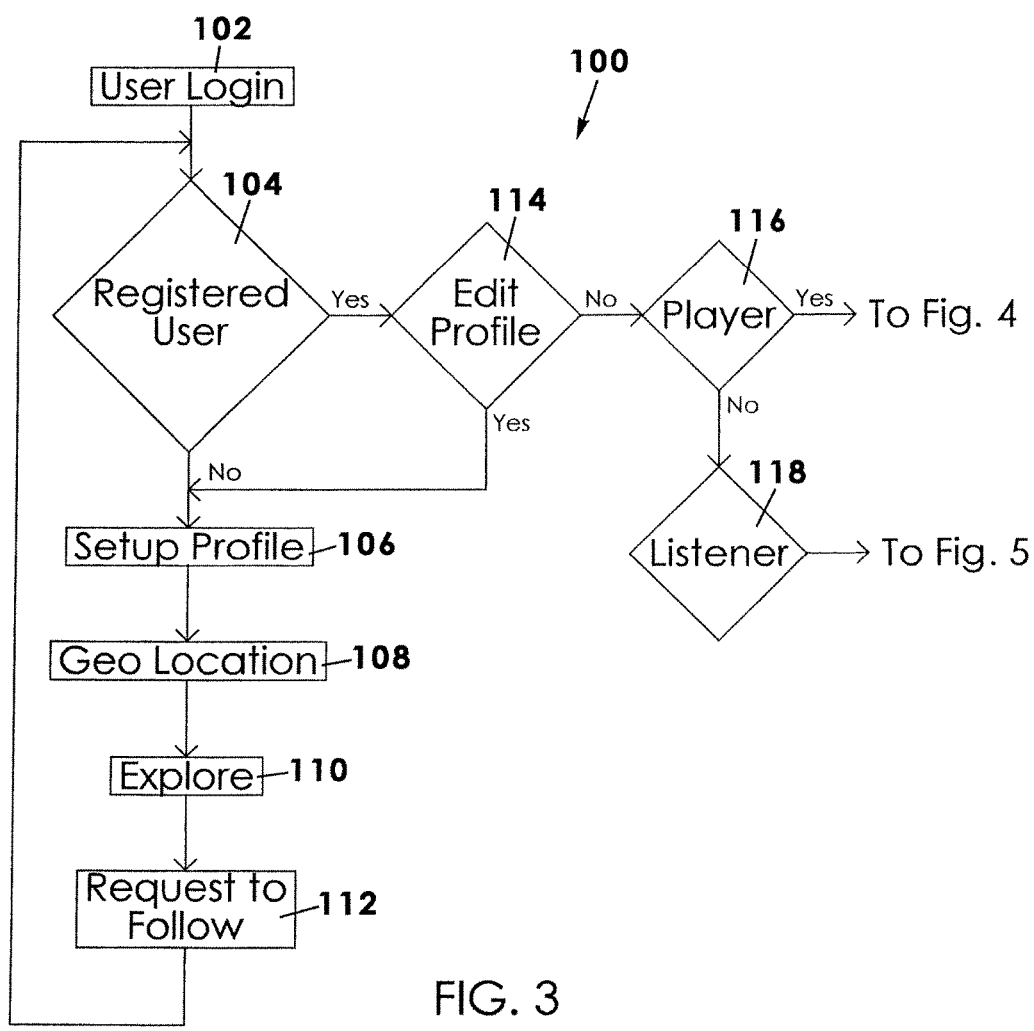
FIG. 3 is a flowchart illustrating the logic of a process for registering a new user to the online music networking system.
Figure 4:
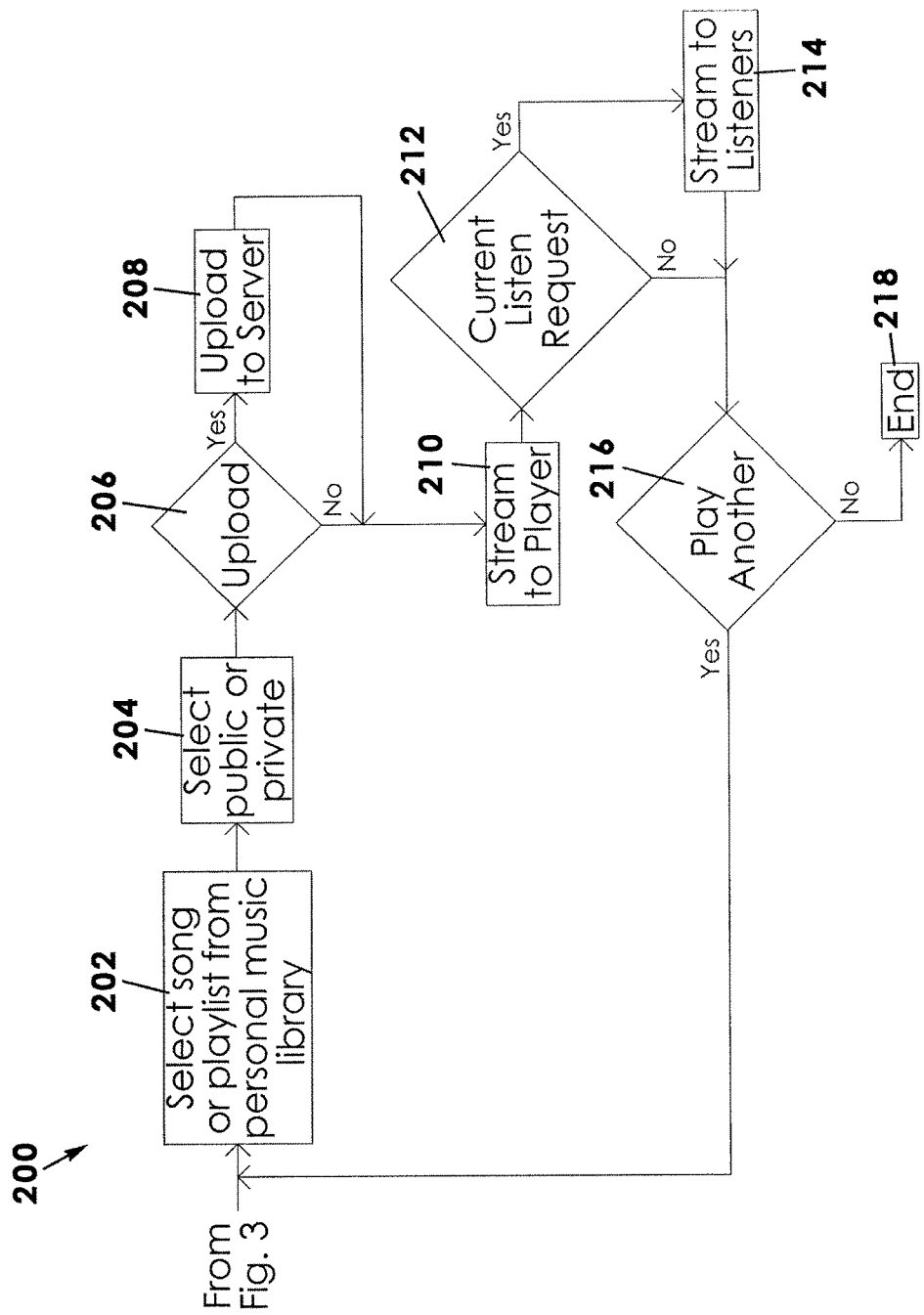
FIG. 4 is a flowchart illustrating the logic of a process controlling a "player's" use of the system.
Figure 5:
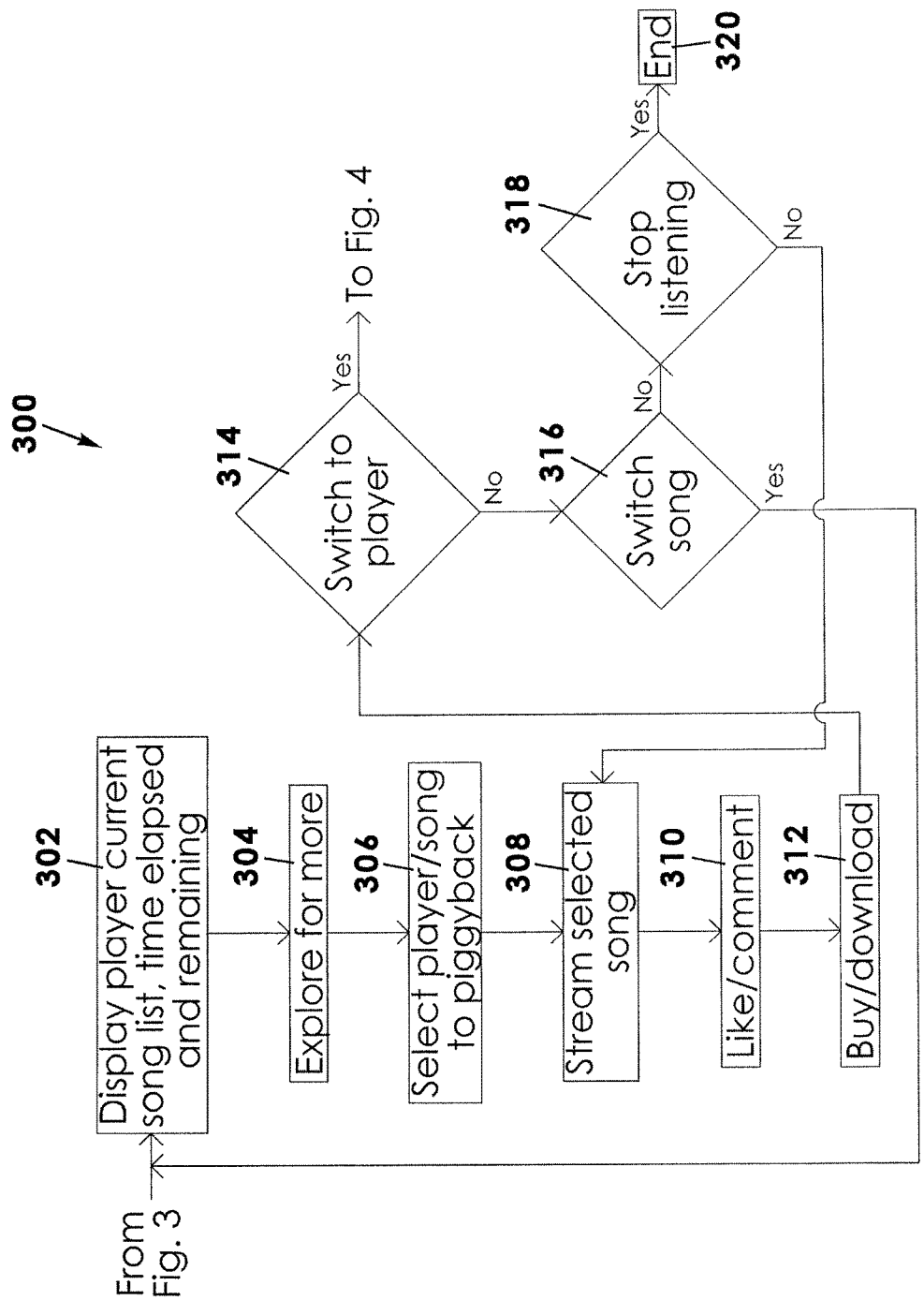
FIG. 5 is a flowchart illustrating the logic of a process controlling a "listener's" use of the system.

Operation of the online music networking system 10 according to an exemplary process is illustrated in the flowcharts of FIGS. 3 through 5 and will be described below. It is understood that the steps of the process are carried out by the processor 26 executing programming stored in memory 22. A new user or returning user may access the system 10 from a cell phone 18 or smart phone having means for connecting to the internet. It is understood that the system 10 may be accessed through a computer capable of connecting to the internet.

A setup and login routine 100 is illustrated in FIG. 3 and begins with a user logging into the system 10, such as by accessing the URL on the internet or initiating a mobile app as shown at step 102. The process 100 then proceeds to step 104. At step 104, the processor 26 determines if a user accessing the system 10 is a registered user and, if so, the process 100 proceeds to step 114; otherwise, the process 100 proceeds to step 106. At step 106, a user profile is setup and saved in memory 22, the profile including personal and electronic contact information. Once profile information has been entered and saved, the process 100 proceeds to step 108 at which a user's geographic location is entered in the form of global position satellite (GPS) coordinates or a physical address. The process 100 then proceeds to step 110 at which a new user is given opportunity to search the music database for music files he may desire to follow and access later in real time when the music file is streamed by a player. The process 100 then proceeds to step 112 at which a new user is given opportunity to formally request to "follow" a player associated with a desired musical file (i.e. song). Essentially, the user is able to send a "follow" or "listen" request in order to become "authorized" to access a live stream of a selected song at which time as the player 14 associated with a selected song chooses to listen to it. It is understood that to be "authorized" may mean that the listener is "registered" or "designated" to be given access to a respective live stream. In another embodiment, a player 14 can actually determine whether to accept the request such that the new user is added to a list of listeners authorized to access a live stream of the player's music file. The process 100 returns to step 104 now that a new user has been registered and has selected at least one player or song to piggyback. In one embodiment, all requests, even from an unregistered user, may be allowed access to a requested live stream.

At step 114, the processor 26 determines if a registered user desires to edit his previously entered and saved profile and if so, the process 100 proceeds to step 106; otherwise, the process 100 proceeds to step 116. At step 116, the processor 26 determines if a user desires to act as a player 14 and, if so, the process 100 proceeds to process 200 which is illustrated at FIG. 4; otherwise, the process 100 proceeds to step 118. At step 118, the processor 26 determines if a user desires to act as a listener 16 and, if so, the process 100 proceeds to process 300 which is illustrated at FIG. 5.

Process 200 illustrates the steps of a player in making a music file available for a live stream to himself and to authorized listeners. At step 202, a player 14 selects a music file, e.g. song, from his personal music library, say, on a computer or mobile phone, or from a previously uploaded music library. The process 200 then proceeds to step 204 where the processor 26 enables the player 14 to determine if a live stream of the selected music file will be accessible to the public or only to listeners who have been previously registered as followers to listen to the player's music files. In other words, while access to a player's music files in a real time stream is normally only authorized to listeners who have requested to follow or "piggyback" a player's music, the player 14, in some embodiments, may allow a "non-follower" or even a user not a registered user of the system 10 to listen to a particular music file or an entire music library. After selecting the public versus private status, the process 200 proceeds to step 206.

At step 206, the processor 26 determines if the player wishes to upload a selected music file or plurality of music files and, if so, proceeds to step 208; otherwise, the process 200 proceeds to step 210. It is understood that step 206 may be skipped altogether and the process 200 advanced to step 210 if the music file selected by a player 14 has been previously uploaded to the music database 32. At step 210, the processor 26 actuates a live stream of the selected/uploaded music file back to the player himself through the wide area network (internet) 12. A primary object of the system 10 is to enable a player 14 to listen to his own music whenever he wishes to hear it. Once the live stream is started, the processor 26, under program control, keeps track of the time started, time elapsed, time remaining, and other statistics and stores these statistics in data structures associated with the music file in the music database. A listener will be interested in these statistics when selecting a music stream to access as will be described later with regard to process 300. After a live stream of a selected music file is actuated, the process 200 proceeds to step 212.

At step 212, the processor 26 determines if there are any current listen requests and, if so, proceeds to step 214; otherwise, the process continues to step 216. The processor 212 must determine if there are listeners who desire to access (i.e. to "piggyback") the current music file being streamed and, if so, to allow access to the live stream. At step 214, the processor 26 directs the live stream to authorized listeners (i.e. to listeners who have selected to follow a player or a selected song and is on the follower list associated with the player or selected music file). More particularly, the authorized listeners are allowed access to the current live stream. It is understood that a respective live stream of a player's song may be accessed by multiple listeners at the same time. Once a respective live stream has been made accessible to authorized listeners, the process 200 proceeds to step 214.

At step 214, the processor 26 determines if the player 14 desires to play another music file or, if the previously selected song is still streaming, simply a different music file. If so, the process 200 proceeds to step 202 at which the process 200 essentially begins again; otherwise, the process 200 proceeds to step 218 and ends.

Process 300 is illustrated in FIG. 5 and represents the logic of a listener 16 accessing a real time stream of a respective player's 14 song selection. At step 302, a listener is able to view a player's music file list to determine what song might be presently streaming live. In one embodiment, a listener 16 may view all currently streaming music selections of all players 14 in the player database. Essentially, a listener is shown a "Now Playing" list. If no music file is desirable to the listener 16, the process 300 may proceed to step 304 at which the process 300 may include a search engine with which to search the databases for particular player names, particular music titles, or the like. The process 300 then proceeds to step 308 at which a current live stream to "piggyback" is selected by the listener 16. The process 300 then proceeds to step 310 at which the processor 26 actuates the selected live stream be directed to the listener 16 through the wide area network or, specifically, that the live stream be made accessible to the listener 16.

Once the live stream is made accessible to the authorized listener (or to multiple listeners as the case may be), the process 300 continues to step 310. At step 310, the processor 26 displays a solicitation to the listener to "like" or "comment" on the streaming music file. For instance, a respective button may be displayed that invites a listener to indicate approval by clicking or by typing a comment. In some embodiments, a listener's evaluation input may be published for the player associated with initiating the stream to see. In another embodiment, evaluation input may be published for all current listeners of the same stream to see. The process 300 then proceeds to step 312.

At step 312, the processor 26 publishes the purchase data associated with the music file that is currently being streamed to the authorized listeners. Preferably, every music file uploaded to the system 10 and stored in the music database 32 includes data indicative of where the song or album may be purchased, such as a link to a website or name of a retail store. In this manner, the holder of the copyright to the music file is benefitted by having listeners 16 directed to where the music may be purchased. In other words, the present system is a live advertisement for the artists whose music is being followed and listened to. The process 300 then continues to step 314.

At step 314, the processor 26 determines if a current listener 16 desires to change his status to that of a player 14 and, if so, proceeds to step 200, described above. Otherwise, the process 300 proceeds to step 316. In other words, a user who has been "piggybacking" and listening to music shared by a player 14 may now desire to share one or more of his own music files with other listeners. At step 316, the processor 26 determines if the listener 16 desires to change the song that he is accessing and listening to and, if so, the process 300 returns to step 302 and the process 300 essentially begins again. Otherwise, the process 300 continues to step 318. At step 318, the processor 26 determines if the listener 16 desires to stop listening altogether and, if so, proceeds to step 320 and the process 300 ends. Otherwise, the process 300 returns to step 308 and the current live stream continues.

It is understood that while certain forms of this invention have been illustrated and described, it is not limited thereto except insofar as such limitations are included in the following claims and allowable functional equivalents thereof.

The invention claimed is:

1. An online music networking system that utilizes a wide area network for coordinating the sharing and listening of music, comprising;

a computer having a processor connected to the wide area network and that provides a user interface to the wide area network;
programming and data structures stored in a computer readable memory in data communication with said processor,
a player database stored in said memory that includes player records associated with a plurality of players who wish to share music with others through the wide area network;
a music database stored in said memory that includes music records associated with respective payers from among said plurality of players in said player database;
a listener database stored in said memory that includes listener records associated with a plurality of listeners that have requested to listen to music that is associated with said respective players;
wherein said programming, when executed by said processor, causes said processor to:
limit access to a respective player in said player database, a respective listener in said listener database, and said music database to an authorized player or an authorized listener;
receive a music file through the wide area network from said respective player and store said received music file to said music database and associate said respective player with said received music file;
receive a listen request (a piggyback request) from said respective listener to access a live stream that is to be streamed to said respective player associated with said received music file;
upon receiving a request from said respective player, selectively immediately actuate a live stream of said stored music file back to said respective player associated with said received music file through the wide area network; and
only when said respective player associated with said received music file has requested and is currently receiving said live stream of said received music file, allow access by said respective listener to said live stream through the wide area network so as to simultaneously piggyback or follow on listening to said live stream along with said respective player associated with said received music file listening to said live stream.

2. The online music networking system as in claim 1, wherein said programming, when executed by said processor, causes said processor to:
receive a plurality of music files through the wide area network from said respective player and associate said respective player with said received plurality of music files;
store said received music files in said memory as a music library associated with said respective player;
receive a current play request from said respective player associated with said received music files to immediately actuate a live stream of a selected music file from said music library associated with said respective player; and
selectively actuate a live stream of said selected music file back to said respective player through said wide area network.

3. The online music networking system as in claim 1, wherein each player record associated with said respective player includes a list of respective listeners from said listener database that have indicated a desire to listen to music files associated with said respective player.

4. The online music networking system as in claim 3, wherein a respective listener is authorized to receive said live stream currently being streamed to said respective player associated with a respective received music file if said respective listener is associated with a respective list of listeners associated with said respective player.

5. The online music networking system as in claim 4, wherein said programming, when executed by said processor, causes said processor to:
receive a player explore request from a respective listener who is seeking to choose respective players from whom to listen to respective music files;
display a portion of said music records associated with respective player records;
receive a music selection from said respective listener who is seeking to listen and send a follow request to a respective player record associated with said music selection.

6. The online music networking system as in claim 5, wherein said programming, when executed by said processor, causes said processor to update a respective list of authorized listeners of a player record to include said listener who is seeking to listen.

7. The online music networking system as in claim 3, wherein each player record includes a geographic location identifier.

8. The online music networking system as in claim 4, wherein said programming, when executed by said processor, causes said processor to:
display a list of currently playing live streams, said list including respective song titles, elapsed times, and remaining times;
receive a listen request from a listener to access to a selected live stream;
selectively direct said selected live stream to said respective listener through said network if said respective listener is authorized to receive said selected live stream.

9. The online music networking system as in claim 1, wherein said programming, when executed by said processor, causes said processor to:
display a list of currently playing live streams, said list including respective song titles, elapsed times, and remaining times;
receive a listen request from a listener to access to a selected live stream;
selectively direct said selected live stream to said respective listener through said network if said respective listener is authorized to receive said selected live stream.

10. The online music networking system as in claim 9, wherein said programming, when executed by said processor, causes said processor to:
publish to a respective listener who is accessing a respective live stream a solicitation to comment on, or indicate liking on a current live stream;
receive evaluation input from said respective listener in response to said solicitation; and
publish said received evaluation input.

11. The online music networking system as in claim 8, wherein said programming, when executed by said processor, causes said processor to:
publish to a respective listener who is accessing a respective live stream a solicitation to comment on, or indicate liking on a current live stream;
receive evaluation input from said respective listener in response to said solicitation; and
publish said received evaluation input.

12. The online music networking system as in claim 1, wherein:
said music file includes purchase data; and
said programming, when executed by said processor, causes said processor to publish said purchase data to said respective listener who is accessing said respective live stream.

13. The online music networking system as in claim 1, wherein said received music file includes access data indicative that an associated live stream is accessible only by authorized listeners or by all listeners.

14. The online music networking system as in claim 3, wherein said received music file includes access data indicative that an associated live stream is accessible only by listeners indicated on said respective list of approved listeners of said respective player.

15. The online music networking system as in claim 1, wherein:
said live stream includes time data indicative of a start time, expected duration, and time remaining;
said programming, when executed by said processor, causes said processor to publish said time data to a requesting listener.

* * * * *